United States Patent [19]

Korngold

[11] Patent Number: 4,752,373
[45] Date of Patent: Jun. 21, 1988

[54] ELECTRODIALYSIS APPARATUS FOR THE CHEMICAL MAINTENANCE OF ELECTROLESS COPPER PLATING BATHS

[75] Inventor: Emmanuel Korngold, Beersheba, Israel

[73] Assignee: Morton Thiokol, Inc., Chicago, Ill.

[21] Appl. No.: 849,319

[22] Filed: Apr. 8, 1986

Related U.S. Application Data

[62] Division of Ser. No. 691,095, Jan. 14, 1985, Pat. No. 4,600,493.

[51] Int. Cl.$^4$ ................................................ B01D 13/00
[52] U.S. Cl. .................................... 204/301; 204/182.4
[58] Field of Search ................... 204/301, 182.3, 182.4, 204/182.5, 182.6

[56] References Cited

U.S. PATENT DOCUMENTS

| | | | |
|---|---|---|---|
| 2,799,644 | 7/1957 | Kollsman | 204/182.5 X |
| 2,948,668 | 8/1960 | De Whalley et al. | 204/301 |
| 2,981,671 | 4/1961 | Griffiths | 204/182.5 X |
| 3,003,940 | 10/1961 | Mason et al. | 204/182.4 |
| 3,073,774 | 1/1963 | Roberts et al. | 204/301 |
| 3,481,851 | 12/1969 | Lancy | 204/89 X |
| 3,488,276 | 1/1970 | Tarsey | 204/301 |
| 3,761,386 | 9/1973 | Smith | 204/301 |
| 3,776,530 | 12/1973 | Griffith et al. | 204/182.4 X |
| 3,933,617 | 1/1976 | Yamamoto et al. | 204/182.4 X |
| 4,289,597 | 9/1981 | Grenda | 204/182.4 |
| 4,324,629 | 4/1982 | Oka et al. | 204/DIG. 13 |
| 4,425,205 | 1/1984 | Honma et al. | 204/DIG. 13 |
| 4,549,946 | 11/1985 | Horn | 204/130 |

Primary Examiner—John F. Niebling
Assistant Examiner—John S. Starsiak, Jr.
Attorney, Agent, or Firm—Gerald K. White

[57] ABSTRACT

A mechanical structure for a three-compartment electrodialytic cell unit utilizing spaced anion perm-selective membranes is characterized by the ease of assembly and disassembly of the parts thereof and adaptation for use as a standard structural component for repeated use in the construction of multiple cell electrodialysis apparatus, with the internal flow of the catholyte and anolyte and an electroless copper solution to be chemically treated being controlled and organized by a plurality of ports in the assembled parts, and with electrical energization of the individual cell units in a multi-cell structure in series, in parallel or series-parallel. The mechanical structure features the elimination of a need to replace the catholyte (NaOH) since each of the cell units generates its own catholyte during the operation thereof, higher electrical current densities than possible with the prior art structures, and hence, greater regenerating capacity for a given cell unit, and control of the fluid pressures on the opposite sides of the membranes and physical protective support for the membranes, also, so that there are no differential pressures or factors tending to adversely affect and damage the membranes.

13 Claims, 6 Drawing Sheets

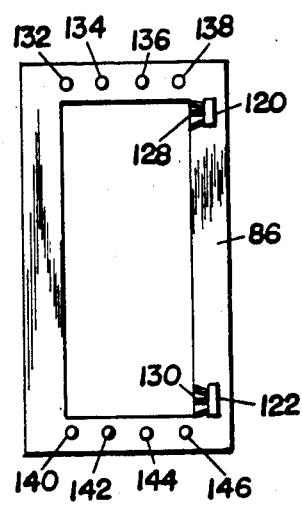
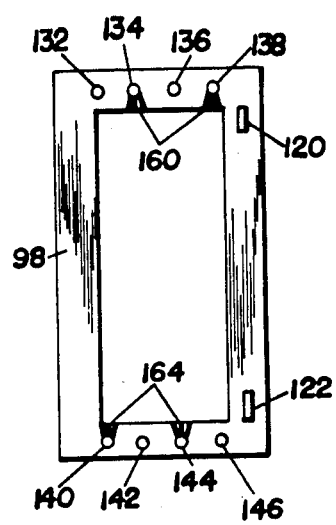
Fig. 8     Fig. 9
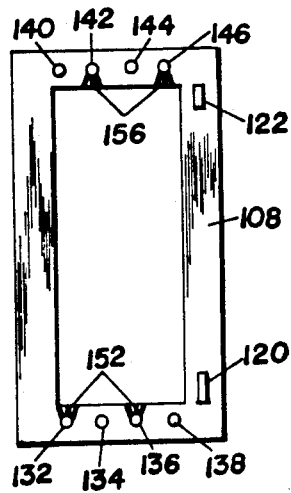
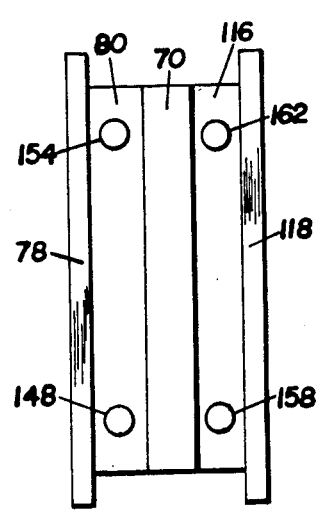
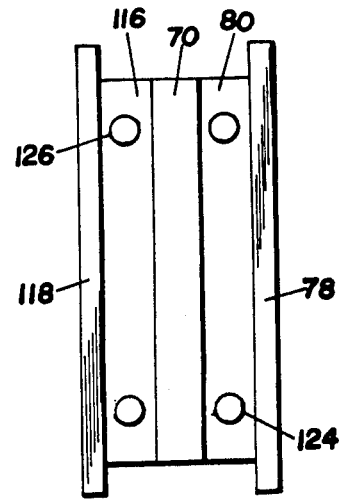
Fig. 10     Fig. 11     Fig. 12

ELECTRODIALYSIS APPARATUS FOR THE CHEMICAL MAINTENANCE OF ELECTROLESS COPPER PLATING BATHS

This is a divisional of co-pending application Ser. No. 691,095 filed on Jan. 14, 1985, U.S. Pat. No. 4,600,493.

BACKGROUND OF THE INVENTION

1. Field of the Invention

The present invention relates to an improvement in apparatus utilizing electrodialysis technology to remove unwanted by-products and to regenerate consumed sodium hydroxide in a working or operating electroless copper plating bath.

2. Description of the Prior Art

An electroless copper plating solution contains copper, usually in the form of copper sulfate, a reducing agent such as formaldehyde, a chelating agent, and an alkali metal hydroxide as essential components.

In the continued use of an electroless copper plating bath, the copper sulfate, formaldehyde, and sodium hydroxide are consumed. Depletion of these components create a need for replenishing them. Additionally, as the bath is used, by-product components are produced that have an inhibiting effect upon the chemical plating action and accumulate in the plating solution. Most notably, these are sodium sulfate and sodium formate. The build up in concentration of such by-products has a deleterious effect upon the performance of the electroless copper plating bath.

In the prior art, replenishment has usually been effected by adding at least two, and in some cases, three or more liquid concentrates to the plating bath. This procedure has several inherent disadvantages, as follows:

1. The addition of liquid concentrates results in an undesired "volume growth" of the plating bath solution. The excess solution must be bailed out, treated and disposed of as hazardous waste.
2. The liquid replenisher concentrates must be added in certain discrete ratios, which in many cases is somewhat critical, in order to maintain the chemical balance of the bath.
3. The user must chemically monitor and control certain reactant concentrations such as sodium hydroxide content.

In U.S. Pat. No. 4,289,597 issued on Sept. 15, 1981 to David W. Grenda, a method involving the use of electrodialysis is disclosed for overcoming the above disadvantages. That method has been likened to an "artificial kidney" for an electroless copper plating bath.

Electrodialysis is a form of dialysis in which an electric current is used to aid the separation of substances that ionize in solution by providing a driving potential to cause the transference of ions across semipermeable membranes. By the application of electrodialysis, the by-products may be removed from an operating electroless copper plating bath while replacing them with freshly generated hydroxide anions.

During the normal operation of an electroless copper plating bath, a chemical reaction, as follows, takes place:

(1) $CuSO_4 + 4NaOH + 2HCHO \rightarrow Cu^0 + Na_2SO_4 + 2NaOOCH + H_2 + 2H_2O$ For every four moles of sodium hyrdoxide (NaOH) consumed, two moles of sodium formate (NaOOCH) and one mole of sodium sulfate ($Na_2SO_4$) are produced. Consequently, for each complete replacement of all of the copper in the plating bath, termed a "cycle," a certain amount of sulfate and formate is produced in the bath.

With continued use and replenishment, the sulfate and formate concentrations increase steadily until the concentration reaches a level where the loss due to volume growth disposal and production rates are balanced. This is a so-called "steady state" condition. During the time between the preparation of a fresh bath and its steady state condition, the bath may display a gradual change in its performance characteristics. Thus, a "cycled" bath is usually always less stable against autocatalytic decomposition than a fresh bath. This is due primarily to the build up of sulfate and formate anions.

In traditional electrodialysis, very small electrical currents are used since charged ions are only being separated. The version of electrodialysis with which the present invention is concerned is significantly different since large electrical currents are needed. Most of this current is used to generate hydroxide ions and also to transport them across the membranes.

In this version of the electrodialysis process, water is electrolyzed to form hydroxide anions at the cathode of the electrodyalysis cell. These anions subsequently migrate across an anion permeable membrane into an electroless copper bath solution which is contained in a compartment between two such anion permeable membranes. Sulfate and formate anions, together with some hydroxide, transfer across the second membrane into the anode compartment of the cell.

Three stoichiometric exchanges take place, as a result of this process, as follows:

1. $2OH^-$ for $1 SO_4^=$
2. $2OH^-$ for $2OOCH^-$
3. $1OH^-$ for $1OH^-$

Hence, the overall net exchange is:

$$4 OH^- \text{ for } 1 SO_4 + 2 OOCH^-$$

Thus, for every mole of sulfate and two moles of formates removed, four moles of hydroxides are introduced. This is a perfect reversal of the reaction which takes place during electroless copper plating where four moles of hydroxides are consumed, producing one mole of sulfate and two moles of formates.

When, and if, there are no sulfates or formates to be removed, there is a simple exchange of one hydroxide for one hydroxide or a net change of zero. As a result, the bath cannot be over-replenished in caustic.

Electrodialysis apparatus for carrying out the method described in U.S. Pat. No. 4,289,597 is described in a TECHNICAL PAPER entitled "THE USE OF ELECTRODIALYSIS FOR THE CHEMICAL MAINTENANCE OF ELECTROLESS COPPER PLATING BATHS" by Dr. Alan A. Poskanzer, Dr. Melvin A. Lipson, and Mr. Stephen C. Davis of the Dynachem Corporation, a subsidiary of Morton Thiokol, Inc., and the assignee of the present invention. That TECHNICAL PAPER was presented at the PRINTED CIRCUIT WORLD CONVENTION held on May 22-25, 1984 in Washington, D.C.

The use of electrodialysis for chemically maintaining electroless copper plating baths, as described in the above TECHNICAL PAPER, has been shown to eliminate many of the inherent limitations of the preelectrodialysis prior art technology. There remain, however, a number of problems in the application of the electrodialysis technology to the chemical maintenance of electroless copper plating baths. These problems include those listed below:

1. The electrodialysis cell has a tendency to generate excessive heat, causing the temperature perature of the electroless copper plating bath to rise beyond control, and limiting, also, the plating bath regenerating capacity of the cell.
2. There are "dead spots" inside the electrodialysis cell where the bath tends to stagnate. In these areas, the solution has a tendency to lose stability and plate out in the cell.
3. The fluid flow is not linear in the several compartments of the cell, being very low in the catholyte and anolyte compartments (circulation in each case being dependent upon a "gas lift" principle with hydrogen being evolved at the cathode and oxygen at the anode) and very high in the regenerating or electroless copper solution compartment. This causes differential fluid pressure imbalances which tend to stretch and distend the anionic membranes and thereby cause them to rupture and cause leaking of solutions from one compartment to another, ultimately resulting in disruption of the electrodialysis process.
4. The mechanical construction of the cell is such that changing membranes is an exceedingly difficult task. The manner in which the electrodes are fabricated inside the cells tends to cause depressions and ruptures in the membranes which subsequently cause leaking of solutions.
5. The caustic generating capacity and the general efficiency of the electrodialysis apparatus is much lower than desirable.

Thus, there is a need and a demand for an improved apparatus utilizing the electrodialysis technology to remove, on a continuing basis, unwanted by-products and to regenerate sodium hydroxide in an operating electroless copper plating bath.

SUMMARY OF THE INVENTION

It is an object of the invention to eliminate the above-mentioned problems inherent in the prior art apparatus for applying electrodialysis technology to the chemical maintenance of electroless copper plating baths.

Another object of the invention is to provide an improved three-compartment electrodialytic cell employing two permselective membranes for separating the compartments wherein the flow of solution past the surface of each of the membranes is laminar or sheet like with eddies introduced therein, and hence, turbulent, thus providing higher efficiency of anion transfer and allowing higher flow rates in each of the compartments.

Another object of the invention is to provide an improvement in the structure of electrodialytic cells that enables higher electrical current densities, and thereby, a greater regenerative capacity for a given cell.

A further object of the invention is to provide an improved structure for electrodialytic cells that is adapted for use as a standard structural component for repeated use in the construction of multiple cell electrodialysis apparatus. Still another object of the invention is to provide such an improved structure for electrodialysis apparatus that allows the individual cells to be operated in series or in parallel or in a series-parallel arrangement.

Yet another object of the invention is to provide an improved structure for electrodialysis apparatus used for the chemical maintenance of electroless copper plating baths in which the need to replace sodium hydroxide has been eliminated.

In accomplishing these and other objectives of the present invention, there is provided a mechanical structure for a three-compartment electrodialytic cell that facilitates assembly and disassembly; in which the fluid flow past each of the cell membranes, on both sides thereof, is laminar, that is, in the form of a thin sheet, while turbulent at the same time, whereby anions are carried off by the fluid as soon as they emerge from the membranes after traversing the latter; in which the fluid pressures on the opposite sides of the membranes are controlled so that there are no differential pressures or forces tending to stretch or distend and thereby tear or rupture the membranes; and in which the membranes are physically supported and protected on both sides thereof and prevented from moving relatively to each other and to the other cell components. The electrodialytic cell structure of the present invention is further characterized in its ready adaptation for use as a standard structural component for repeated use in a multiple cell electrodialysis apparatus.

The electrodialytic cell according to the present invention removes at least a portion of the anionic reaction products from an operating electroless copper plating bath by withdrawing the undesired anions through an anionic permselective membrane. The electroless copper plating bath solution is regenerated in an electroless bath regeneration or center compartment that is positioned between a catholyte compartment and an anolyte compartment. Separate anionic permselective membranes separate the regeneration compartment from the catholyte and anolyte compartments. The permselective membranes allow the selective migration of anions through them to the substantial exclusion of cations.

The catholyte compartment contains a source of hydroxyl ions in aqueous solutions, generally an alkali metal hydroxide such as sodium hydroxide. The anolyte compartment contains an aqueous acidic solution such as sulfuric acid. The solution in the electroless bath regeneration compartment is selected to receive the anionic reaction by-products of the reduction reaction that occurs during electroless plating.

In operation, the electrodialytic cell effects the migration of hydroxyl ions from the catholyte compartment through the associated anionic membrane to the regeneration compartment, and effects, concurrently, the migration of anions of the reaction product salts to the anolyte compartment from the regeneration compartment through the anionic membrane associated with the anolyte compartment. This effects the replacement of the anions of the alkali metal salts by hydroxyl ions and causes an increase in the pH of the solution in the regeneration compartment.

In accordance with the invention, perforated spacers maintain the permselective membranes in position. These spacers also cause the flow of solution to be laminar over the surface of each face of the membranes while introducing a perturbation or turbulence in the flow at the same time. This turbulence and laminar flow provides for higher efficiency in carrying off the hydroxyl ions from the cathode compartment of the electrodialytic cell and the anions from the electroless copper or regeneration compartment.

Overlapping gaskets provided in association with each face of the permselective membranes protect the latter from the possibility of damage by the perforated spacers and other adjacent structural components of the cell.

BRIEF DESCRIPTION OF THE DRAWINGS

FIGS. 8, 9 and 10 are plan views of cathode, electroless copper and anode compartment frames, respectively, of the single cell unit of FIG. 4;

FIGS. 11 and 12 are views of the left and right sides, respectively, of the assembled single cell unit of FIG. 4;

DESCRIPTION OF A PRIOR ART ELECTRODIALYTIC CELL

Figure 1:
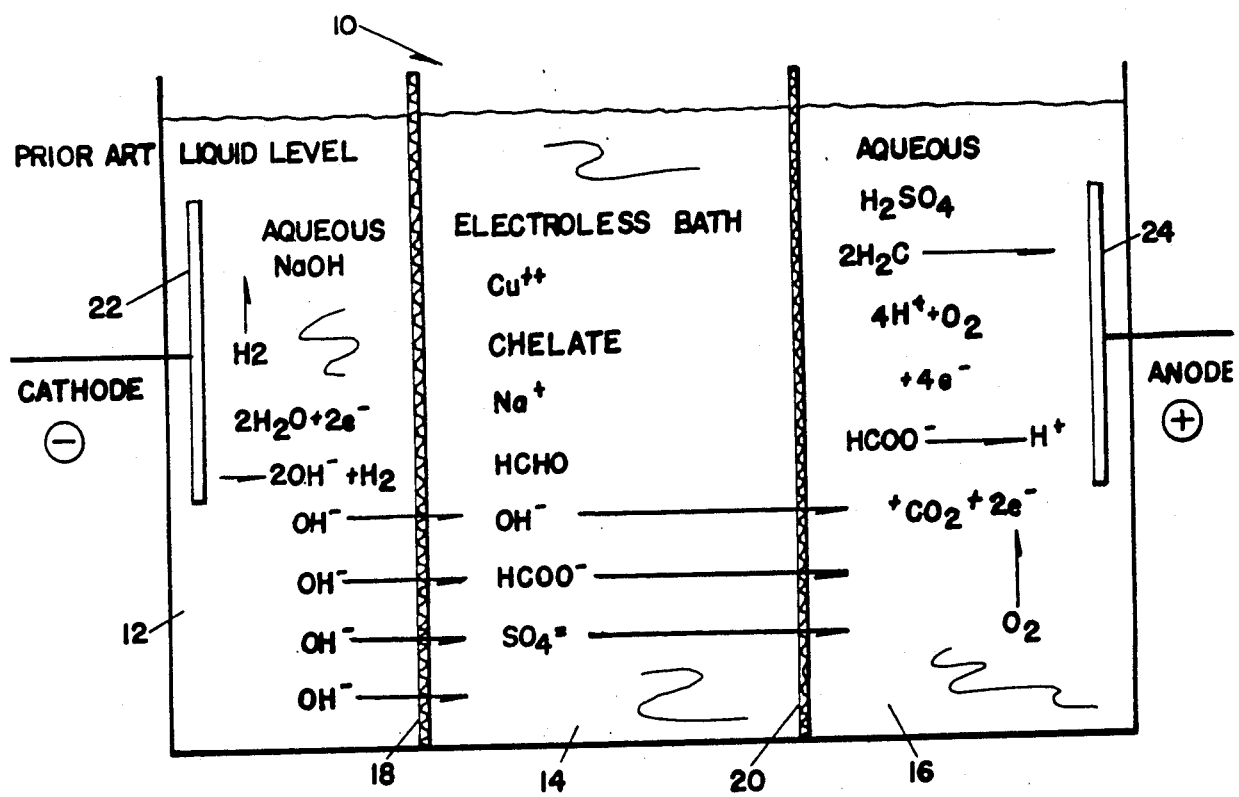
FIG. 1 is a schematic illustration of the prior art electrodialysis process.

In FIG. 1 there is schematically illustrated a prior art electrodialytic cell 10 upon which the electrodialytic cell of the present invention is an improvement, which prior art cell 10 is divided into three compartments 12, 14 and 16 that are separated from each other by permselective membranes 18 and 20. Membranes 18 and 20 are permeable only to anions.

On one side of the cell 10 is a cathode electrode 22 made of steel. In the cathode compartment 12 is a mild solution of sodium hydroxide, forming the catholyte. The electrochemical half reaction occurring at the cathode electrode 22 is as follows:

$$2H_2O + 2e^- \rightarrow 2OH^- + H_2 \uparrow \tag{2}$$

The sodium hydroxide is used simply for the purpose of maintaining alkalinity of the catholyte and of creating a concentration gradient of hydroxide across the associated membrane to improve the efficiency of migration. Hydrogen gas is vented from the cathode compartment. Water is injected on a demand basis to maintain a constant level.

On the other side of the cell, in compartment 16, is an anode electrode 24 made of titanium plated with platinum and immersed in an anolyte consisting of a mild sulfuric acid solution. The electrochemical half reaction occurring at the anode electrode 24 is as follows:

$$(3) \quad 2H_2O \rightarrow 4H^+ + O_2 \uparrow + 4e^- \tag{3}$$

The generated oxygen is vented from the anode compartment.

There is also a secondary reaction that occurs at the anode electrode 24. This reaction is a consequence of formate entering the anode compartment 16:

$$OOCH^- \rightarrow CO_2 \uparrow + H^+ + 2e^- \tag{4}$$

Combining the cathode and anode processes, the following electrochemical reaction is derived by doubling the reaction of equation (2) and adding it to the reaction of equation (3):

$$6H_2O \rightarrow 4OH^- + 4H^+ + 2H_2 + O_2 \tag{5}$$

The hydroxide is produced at the cathode electrode 22 while the hydronium ions are produced at the anode electrode 24.

The electroless copper bath is contained in the central compartment 14 which separates the cathode electrode 22 from the anode electrode 24. Upon application of electric current, the hyrdoxide produced at the cathode electrode 22 migrates across the cathode membrane 18 into the electroless copper bath. Sulfate, formate and hydroxide anions, in turn, migrate across the anode membrane 20 into the anolyte compartment 16 where hydronium ions are produced, creating sulfuric acid from the accumulating sulfate. The formate is oxidized into gaseous by-products.

As a result of this process, the sulfate and formate by-products that tend to build-up in the electroless plating bath are removed and replaced with fresh hydroxide. There is no build-up of cations such as sodium in the bath.

DETAILED DESCRIPTION OF THE PREFERRED EMBODIMENTS

Figure 2:
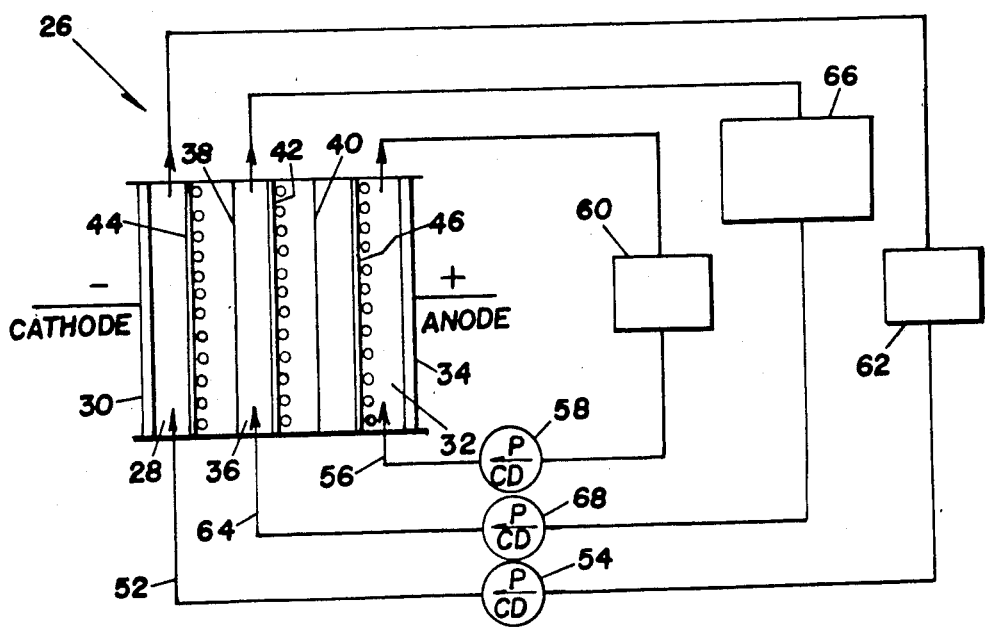
FIG. 2 is a schematic illustration of a system and process employing a three-compartment electrodialytic cell according to the present invention.

FIG. 2 is a schematic illustration of a system and process employing a three-compartment electrodialytic cell 26 according to the present invention for chemically maintaining an electroless copper plating bath. In addition to a first compartment, a cathode compartment 28, which contains a cathode electrode 30, and a second compartment, an anode compartment 32, which contains an anode electrode 34, the electrodialytic cell 26 includes a third compartment, an intermediate electroless copper or regenerating compartment 36. Compartment 36 is defined by permselective anion membranes 38 and 40 which separate the electroless copper compartment 36 from the cathode compartment 28 and anode compartment 32, respectively. Three identical perforated spacers are provided for separating the membranes 38 and 40 from each other and from the electrodes 30 and 34. Specifically, a spacer 42 is positioned between membranes 38 and 40, a spacer 44 is positioned between membrane 38 and electrode 30, and a spacer 46 is positioned between membrane 40 and electrode 34.

Figure 13:
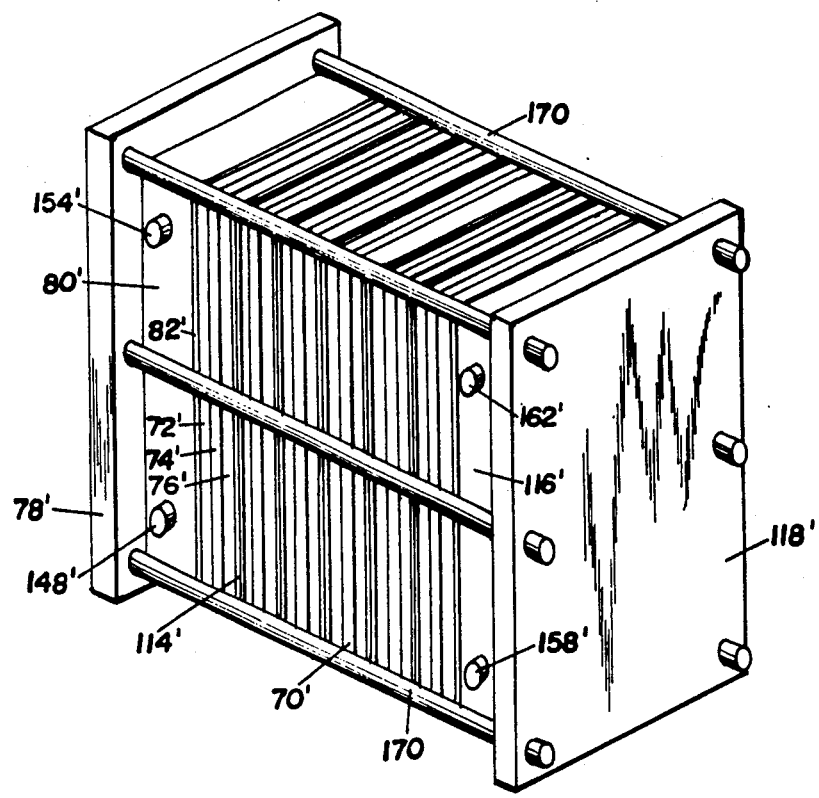
FIG. 13 is a pictorial view of a multi-compartment apparatus comprising a bank of six electrodialytic cells packaged at a single unit.

While, for convenience of illustration, the several components of the electrodialytic cell 26 have been shown in spaced apart relation in FIG. 2, it will be understood that in a practical embodiment thereof, according to the invention, these components would be arranged in a closely packed relation, as illustrated in FIGS. 11, 12 and 13.

Figure 3:
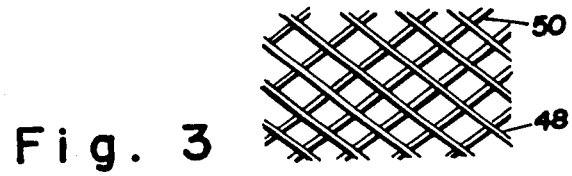
FIG. 3 is a plan view of a preferred perforated spacer configuration employed in the electrodialytic cell of FIGS. 2 and 4.

A preferred configuration for the perforated spacers 42, 44 and 46 is the crisscross arrangement shown in FIG. 3. As there shown, these spacers each comprise a layer in a first plane of a plurality of slender plastic wires or rods 48 positioned in a first direction in spaced parallel relation and touching and joined to a second layer, in a second plane, of a plurality of substantially identical slender plastic wires or rods 50 positioned in a second direction in spaced parallel relation. Orientation of the layers of rods 50 away from a right angle relationship with each other and from the fluid flow as the fluid flow enters the associated electrodialytic cell compartment promotes an advantageous flow pattern.

With this configuration for each of the spacers 42, 44 and 46, there is introduced a perturbation, that is, eddies or turbulence, in the otherwise laminar flow of fluid past the associated membrane surface whereby anions are carried off by the fluid as soon as they emerge from the membrane after traversing the latter from the opposite side. Such turbulence in the fluid flow also reduces any tendency to excessive heating of the electrodialytic cell.

A preferred composition for each of the membranes 38 and 40 is that described and claimed in U.S. Pat. No. 3,388,080 that was issued on June 11, 1968 to Francis de Korosy, et al., which patent by reference herein is made a part hereof.

Catholyte and, in particular, an aqueous solution of sodium hydroxide is fed to the cathode compartment and around a circuit 52 by a pump 54. Anolyte, comprising an aqueous solution of sulfuric acid, is fed to the anode compartment and around a circuit 56 by a pump 58. A source 60 of dilute sulfuric acid is included in circuit 56, as shown, to maintain the acidity of the anolyte at a suitable level. While a source 62 of sodium hydroxide has been shown as included in circuit 52, such a source 62 may be dispensed with for some applications since the electrodialytic cell 26 manufactures its own sodium hydroxide. For such applications, it may be sufficient to provide an initial charge of aqueous sodium hydroxide in compartment 28 and circuit 52.

A solution of electroless copper is fed through a circuit 64 to the intermediate compartment 36 from an electroless copper plating bath 66 by a pump 68.

In accordance with the invention, pumps 54, 58 and 68 preferably are identical low pressure pumps. In an operative embodiment of the invention, a pump that has been found suitable is a Model No. 7022-20, having a capacity of 10 gallons per minute, that is distributed by Cole-Parmer Instrument Company, 7425 North Oak Park Avenue, Chicago, Ill. 60648. A feature of this pump is that it includes no metallic parts in contact with the solution being pumped. This avoids undesired plating out of copper that might otherwise occur due to stray electrical currents.

By the use of identical pumps 54, 58 and 68 for circulating the catholyte, anolyte and electroless copper in the respective compartments 28, 32 and 36, as those skilled in the art will understand, the fluid pressures on the opposite sides of the permselective membranes 38 and 40 are controlled. That is to say, the pressures on the opposite sides of the membranes are the same and are maintained substantially the same at all times, whereby no differential pressures or forces are created that might tend to stretch and distend and thereby tear or otherwise rupture the membranes.

It is noted, additionally, that because of the closely packed relation of the several components of the electrodialytic cell 26, the perforated spacers 42 and 44 provide physical support for the membrane 38, and the perforated spacers 44 and 46 provide physical support for the membrane 40.

Figure 4:
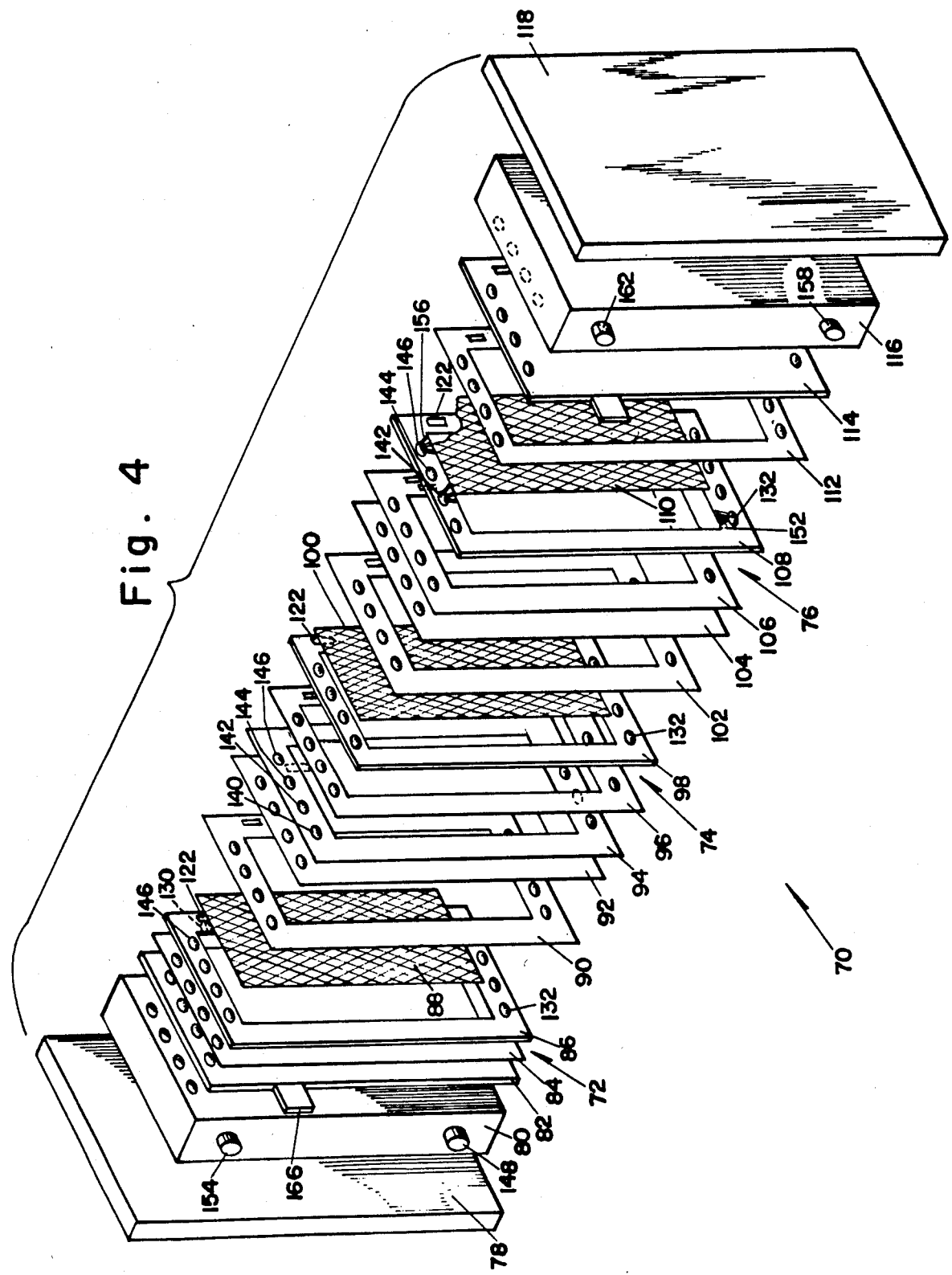
FIG. 4 is an exploded view illustrating a preferred embodiment of a single electrodialytic cell unit, according to the present invention, for use in the system and process of FIG. 2.

FIG. 4 illustrates an exploded or expanded view of a preferred embodiment of a single electrodialytic cell unit 70, according to the present invention, for use in the system and process of FIG. 2. The electrolytic cell 70 includes a first compartment, cathode compartment 72, a second compartment, specifically an electroless copper or regenerating compartment 74, and a third compartment, anode compartment 76, arranged in that order, as shown. Cell unit 70 further includes a backup plate 78, which may be made of stainless steel, and a plastic press block 80 at one end, adjacent the cathode compartment 72. A similar backup steel plate 118 and plastic press block 116 are provided at the other end of cell unit 70.

The cathode compartment 72 of cell unit 70 includes, in sequence, a solid, that is dimensionally stable cathode electrode 82 that is positioned against the inner surface of block 82, a plastic cathode compartment cover frame 84, a cathode compartment frame 86, a plastic perforated spacer 88, coplanar with frame 86 a first over-lapping plastic gasket frame 90, and an anionic exchange permselective membrane 92. The perforated spacer 88 fits within and substantially fills the cutout or opening within the cathode compartment frame 86, the thickness of spacer 88 and frame 86 being approximately the same. For guarding the permselective membrane 92 against the possibility of damage as the result of coming into contact with a rough edge of the opening in the cathode compartment frame 86 or with a rough edge of the perforated spacer 88, the opening in the gasket frame 90 is made slightly smaller than the perforated spacer 88 and thus overlaps the latter and also the opening in frame 86 on all sides.

The electroless copper or regenerating compartment 74 includes, in sequence, the anionic membrane 92, an overlapping plastic gasket frame 94 which may be identical to the overlapping gasket frame 90, a plastic electroless copper compartment cover frame 96 that may be identical to the cover frame 84, a plastic electroless copper compartment frame 98, a seond plastic perforated spacer 100 coplanar with frame 98, which spacer 100 may be identical to spacer 88, an overlapping gasket frame 102 that may be identical to gasket frames 90 and 94, and an anionic permselective membrane 104. The spacer 100 fits within and substantially fills the opening in the electroless copper compartment frame 98.

The anode compartment 76 includes, in sequence, the anionic membrane 104, an overlapping plastic gasket frame 106 that may be identical to the gasket frames 90 and 94, a third plastic anode compartment frame 108, a perforated plastic spacer 110 coplanar with frame 108, which spacer 110 may be identical to spacers 88 and 100, a plastic anode compartment cover frame 112, and a dimensionally stable anode electrode 114. The spacer 110 substantially fills the opening in the anode compartment frame 108.

As shown, the openings or cutouts in the several frames are all centrally located and are of the same size except for the gasket frames 90, 94, 102 and 104 which are slightly smaller than the other openings.

The single electrodialytic cell unit 70 is completed by the plastic press block 116 and backup steel plate 118, the inner surface of the press block 116 being in contact with the anode electrode 114. The entire assembly is forced together in fluid tight relation by suitable stainless steel rods, as illustrated in FIG. 13, that extend between the opposed steel backup end plates 78 and 118.

While any suitable plastic material may be used for the several plastic components embodied in the electrodialytic cell 70, tetrafluoroethylene is a preferred material. Such material is available commercially under the name TEFLON, a trademark of E. I. du Pont de Nemours & Co., Wilmington, Delaware. Rods 48 and 50 of the perforated spacers 88, 100 and 110 preferably are made of polyethylene.

Figure 7:
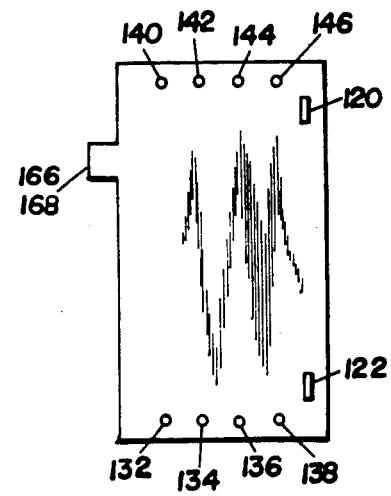
FIG. 7 is a plan view of the cathode and anode electrodes that are employed in the single cell unit of FIG. 4.

A plan view of the cathode electrode 82 and anode electrode 114 is shown in FIG. 7. The cathode electrode 82 may be made of stainless steel whereas the anode electrode desirably is made of titanium with a dimensionally stable coating, for example, a platinum coating two microns thick, on one side only. As seen in FIG. 4, the platinum side of anode electrode faces inwardly of the anode cell compartment and is exposed to the anolyte solution.

Figure 10A:
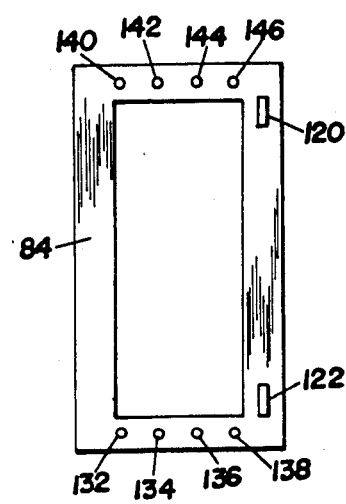
FIG. 10A is a plan view of the cover frames for the cathode, anode and electroless copper solution compartments.

Plan views of the cathode compartment frame 86, the electroless copper compartment frame 98, and the anode compartment frame 108 are shown in FIGS. 8, 9 and 10, respectively. The anode compartment frame 108 and the electroless copper compartment frame 98 may be identical. When used as an electroless copper compartment frame, however, the frame is positioned with the grooves 164 facing toward the cathode compartment 72. Used as an anode compartment frame, the grooves 164 are faced away from the cathode compartment frame 72.

Additional electrodialytic cells may be added between the opposed plastic end blocks 80 and 116 by supplying additional sets of the components as delineated above and in the sequence stated. For example, to add a second electrodialytic cell to the assembly as shown in FIG. 4, the several components of the assembly beginning with the cover plate frame 84 would be repeated, in the same sequence, following the anode electrode 114. So arranged, the two cells would be connected in series, with the electrode 114 serving as an anode for the first cell and a cathode for the second cell. Such an electrode is referred to in the art as a "bipolar" electrode. A requirement for a bipolar electrode is that it have a dimensionally stable coating on both sides.

For supplying a driving electrical potential to the two cells in series, the negative terminal of a suitable direct current source would be connected to the cathode electrode 82 and the positive terminal of the source would be connected to the second of the anode electrodes corresponding to the electrode 114.

Figure 14:
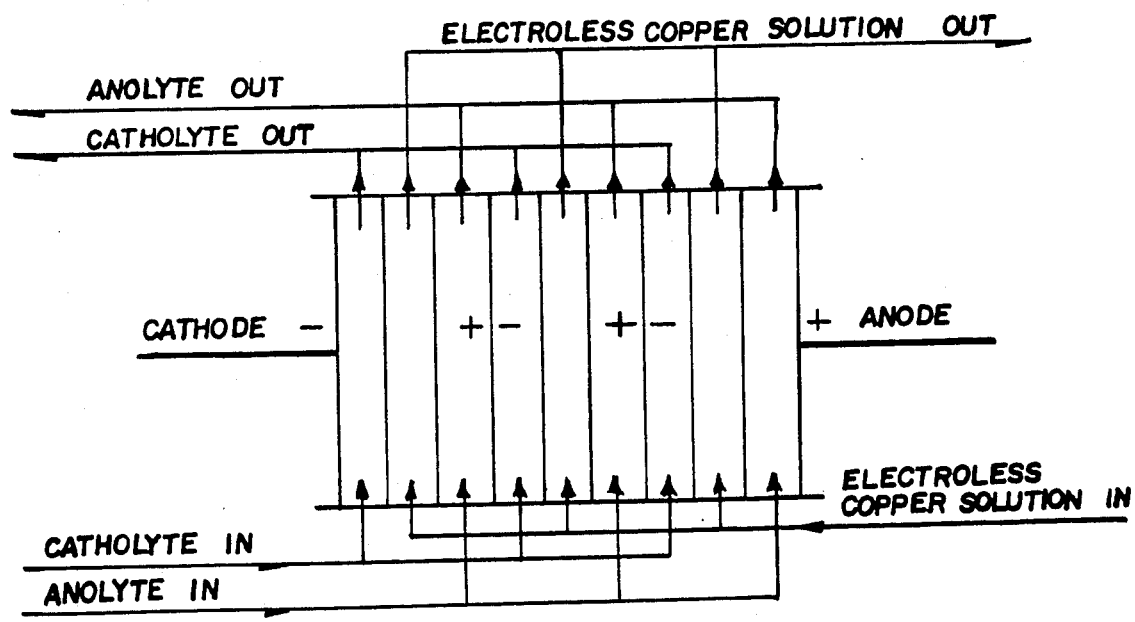
FIG. 14 is a schematic representation of a plurality of electrodialytic cells, according to the invention, connected for electrical energization in series and using bipolar electrodes.

Also, as those skilled in the art will understand, if desired, three, or more, electrodialytic cells may be assembled for such series operation by again repeating the process, as described above. The number of cells that it is practical to so connect in series is determined by the voltage required for efficient operation of each cell, the internal resistance of the assembly, and other electrical considerations. A three cell series arrangement using bipolar electrodes is shown in FIG. 14.

Figure 15:
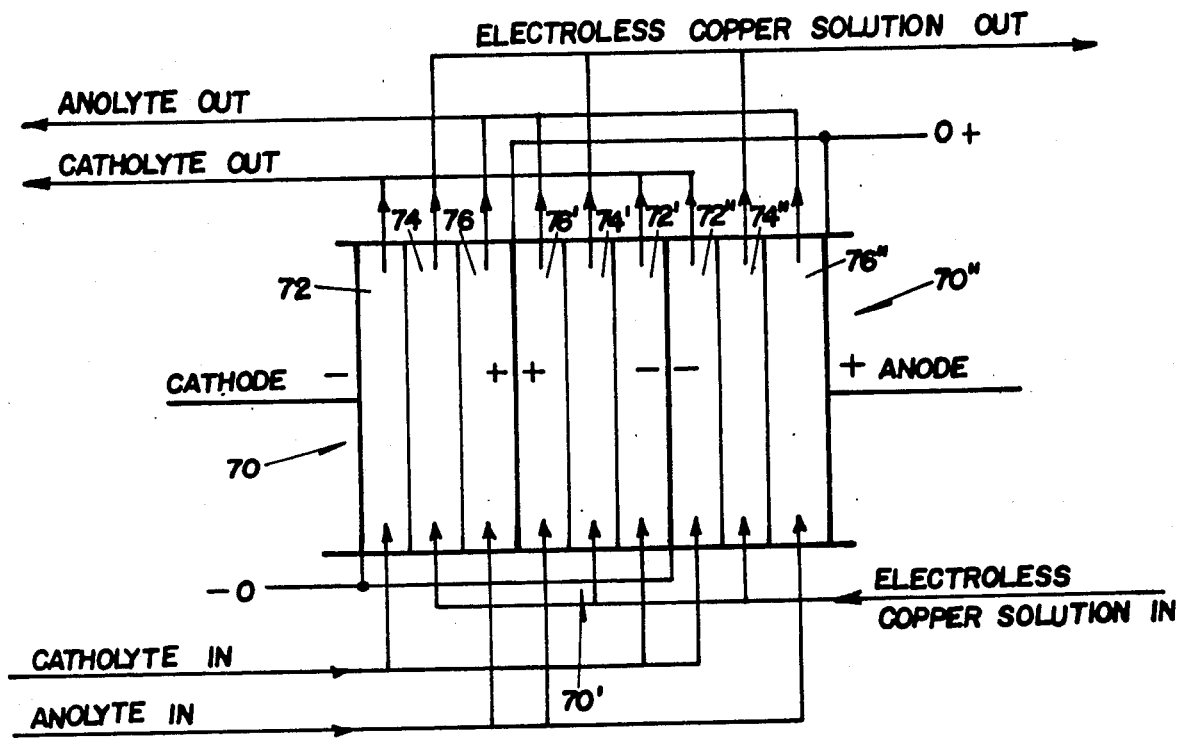
FIG. 15 is a schematic representation of a plurality of electrodialytic cells, according to the invention, connected for electrical energization in a parallel arrangement.

If it is desired to operate each of the electrodialytic cells of a multi-cell assembly in parallel, it is noted that this may be accomplished, as illustrated in FIG. 15, by repeating each of the compartments 72, 74 and 76 of the electrodialytic cell 70 in a reversing order. That is to say, after the first cell 70, as shown in FIG. 4, the second cell, 70', would be formed by the addition, following the anode electrode 114, of the several components of the assembly, beginning with the plastic cover frame 112, in the reverse sequence. For the addition of a third cell, 70", the several components of the assembly beginning with the cover plate frame 82 would be added in the sequence shown in FIG. 4 after the cathode electrode of the second cell.

With the electrodialytic cells connected for operation in parallel, as shown in FIG. 15 and as above described, it is noted that the same voltage (9 volts or less) would be applied across each of the multiple cells, but the electrical current level, in amperes, through each cell would be higher.

Figure 16:
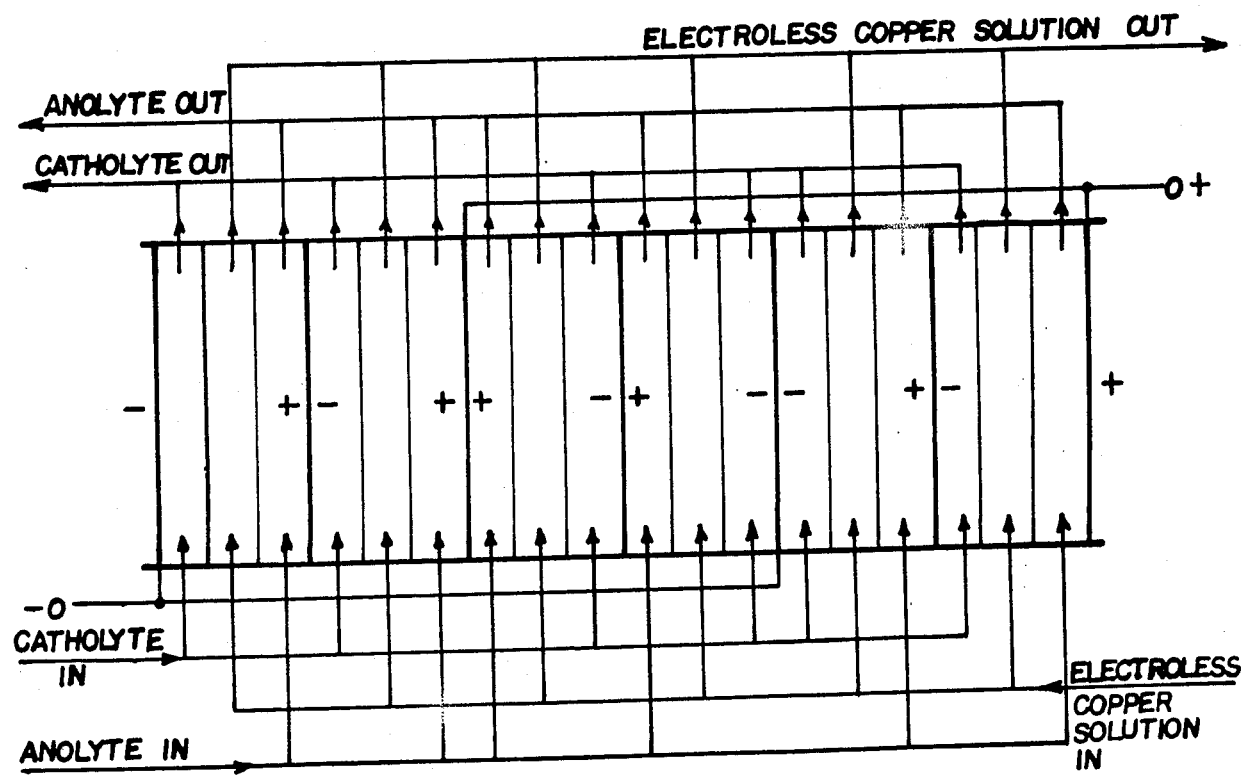
FIG. 16 is a schematic representation of a plurality of electodialytic cells, according to the invention, connected for electrical energization in a series-parallel arrangement.

FIG. 16 shows a schematic representation of a plurality of electrodialytic cells 70 connected in a series-parallel arrangement.

As illustrated in FIG. 4–12, internal flow of the catholyte, anolyte and electroless copper in the electrolytic cell 70 is controlled and organized by a plurality of rectangular and circular ports that are provided in the plastic press blocks 80 and 116 and in the frame, membrane and electrode components, adjacent three edges of each component. Thus, rectangular ports 120 and 122 are provided in each of blocks 80 and 116 and in the cell unit frame and membrane components, the ports 120 and 122 being on the internal side only of the blocks 80 and 116 and connected by internal passageways to external inlet and outlet catholyte connectors 124 and 126, respectively. When the electrodialytic cell is assembled, all of the rectangular ports 120 are in alignment as are also all of the rectangular ports 122.

Ports 120 and 122 provide communication to the cathode compartment 72 from the external connectors 124 and 126. This communication, by way of slots or grooves 128 and 130, is formed in the plastic cathode compartment frame 86 on the side thereof facing the plastic cathode cover frame 84, as seen in FIG. 4, and extending, respectively, from the rectangular ports 120 and 122 in frame 86 to the central opening thereof. The plastic cathode cover frame 84 and the plastic cathode compartment frame together define the cathode compartment 72 and the grooves 128 and 130. The material of the cover frame 84 is sufficiently stiff, being made of TEFLON, for example, as described hereinbefore, that it does not flow into and block the grooves 128 and 130. The inlet connector 124 on block 80, the rectangular ports 120, and grooves 128 on frame 86 provide an inlet path for catholyte to flow to the catholyte compartment 72. An outlet path for the flow of catholyte from the compartment 72 is provided by the grooves 130 on frame 86 and the rectangular ports 122 to the external outlet connector 126 on block 116.

Similarly, circular ports are provided adjacent each of the opposite short edges of the blocks 80 and 116 and of the frame, membrane and electrode components, as seen in FIGS. 4–10, for providing an internal flow of anolyte to the anolyte compartment 76 and an internal flow to the electroless copper compartment 74 of electroless copper solution to be regenerated.

Figure 5:
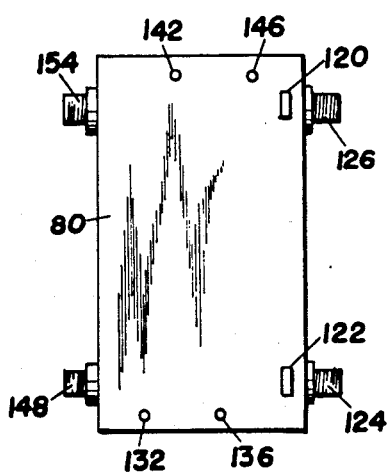
FIG. 5 is a plan view of the interior surface of the press block provided at the left end of the single cell unit of FIG. 4.
Figure 6:
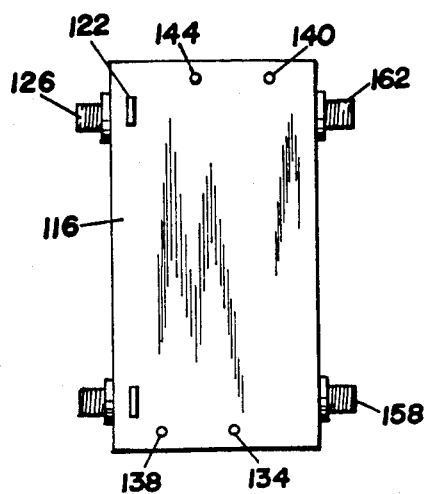
FIG. 6 is a plan view of the interior surface of the press block provided at the right end of the single cell unit of FIG. 4.

Thus, four spaced circular ports 132, 134, 136 and 138 are provided adjacent one of the side edges of each of the frame, membrane and electrode components, and four similar spaced circular ports 140, 142, 144 and 146 are provided adjacent the other side edge of each of those components. Only two spaced circular ports are provided adjacent each of the short edges of the blocks 80 and 116, however. Thus, as best seen in FIG. 5, on one side of block 80, circular ports 132 and 136 only are provided, and on the other side of block 80, only ports 142 and 146 are provided. Similarly, as best seen in FIG. 6, on block 116, on one side thereof, ports 134 and 138 only are provided, and on the other side, ports 140 and 144 only are provided. When the electrodialytic cell 70 is assembled, all of the correspondingly numbered ports of the blocks 80 and 116 and of the frame, membrane and electrode components are in alignment.

An external anolyte inlet connector 148 provided on block 80, as shown in FIG. 5 and connected internally of block 80 to circular ports 132 and 136, provides an inlet communicating pathway to the anolyte compartment 76. This inlet pathway to the anolyte compartment 76 includes the circular ports 132 and 136 in the anode compartment frame 108 together with grooves 152 provided between the ports 132 and 136 and the central opening in frame 108. The plastic anode cover frame 112 and the plastic anode compartment frame 108 together define the anode compartment 76 and the grooves 152 as well as similar grooves 156 provided on the same side of the anode compartment frame at the other end thereof. The material of the anode cover frame 96 is sufficiently stiff that it does not flow into and block the grooves 152 and 156. The path of communication from compartment 76 to an external anolyte output connector 154 on block 80 is by way of grooves or slots 156 in frame 108 and the circular ports 142 and 146.

Similarly, an external electroless copper inlet connector 158, as best seen in FIG. 6 and internally connected in block 116 to circular ports 134 and 138, provides an inlet communicating pathway to the electroless copper compartment 74. This inlet pathway includes the inlet connector 158 on block 116, tne circular ports 134 and 138 in the electroless copper compartment frame 98 together with grooves 160 that are provided between ports 134 and 138 and the central opening provided in frame 98. The plastic electroless copper cover frame 96 and the plastic electroless copper compartment frame 98 together define the electroless copper compartment 74 and the grooves 160 as well as similar grooves 164 provided on the same side of the electroless copper compartment frame 98 at the other end thereof. The material of the plastic cover frame 96 is sufficiently stiff that it does not flow into and block the grooves 160 and 164. The path of communication from the electroless copper compartment 74 to an external electroless copper outlet connector 162 on block 116 is by way of grooves 164 in frame 98 and the circular ports 140 and 144.

The electroless copper plating bath solution undergoing replenishment electrodialysis and the catholyte and anolyte solutions thus flow through the associated compartments of the electrodialytic cell 70, the flow through each compartment in an operative embodiment being laminar but turbulent, as described hereinbefore, and moving within each compartment at a linear speed of, typically, two to three centimeters per second with the pressures on the opposite sides of the membranes 92 and 104 being substantially the same since identical pumps are used to effect each of the fluid flows.

A cathode terminal 166 and an anode terminal 168 pass through to the exterior of the cell 70 for connection to an appropriate source of direct current electrical power (not shown). Thus, the electroless copper solution undergoing chemical change in the cell 70 is acted upon by the electrical states of the cathode electrode 82 and the anode electrode 114, and by the differentiating abilities of the anion permselective membranes 92 and 104.

By way of illustration and not limitation, it is noted that in an operative embodiment of the electrodialytic single cell unit illustrated in FIGS. 3–12, the spacing between the permselective membranes 92 and 104 is about 2 mm, and the thickness of the single cell unit 70 including the cathode electrode 82 and the anode electrode 114, but excluding the blocks 80 and 116 and the steel plates 78 and 118, is about 8 mm. The materials used for the several components and their dimensions were as follows:

Backup steel plates 78 and 118—316 stainless steel
  Dimensions: 312 mm long; 178 mm wide; 15 mm thick
Plastic press blocks 80 and 116—Teflon, a trademark of E. I. du Pont de Nemours & Co.
  Dimensions: 266 mm long; 144 mm wide; 40 mm thick
Cathode electrode 82—stainless steel
Anode electrode 114—Titanium covered on one side only with platinum two microns thick
  Dimensions: 264 mm long ; 130 mm wide; 2 mm thick
Cover plate frames 84, 96 and 112—Teflon
  Dimensions: 266 mm long; 131 mm wide; 0.8 mm thick with a centrally located frame opening 220 mm long and 90 mm wide
Cathode compartment frames 86—Teflon
  Dimensions: 264 mm long; 131 mm wide; 1.6 mm thick with a centrally located frame opening 220 mm long and 90 mm wide
Perforated spacers 88 and 100—Slender polyethylene rods 1 mm in diameter
  Dimensions: 220 mm long and 90 mm wide
Gasket frames 90, 94, 102 and 106—Teflon
  Dimensions: 266 mm long; 131 mm wide; 0.1 mm thick with a centrally located window 216 mm long and 86 mm wide
Electroless copper solution and anode compartment frames 98 and 108—Teflon
  Dimensions: 264 mm long; 131 mm wide; 1.6 mm thick with a centrally located opening 220 mm long and 90 mm wide
Anion exchange membranes—
  Dimensions: 270 mm long; 130 mm wide with an active surface area of 198 sq. cm. on each side—the spacing of the membranes being 2 mm With this arrangement, it is noted that the ratio of the volume of the fluid within each of the compartments 72, 74 and 76 of the electodialytic cell 70 to the active surface area of one side of each of the permselective membranes is very low, being 1 to 5. That is to say, with a spacing of 2 mm between the permselective membranes 92 and 104 and an active surface area of approximately 198 square centimeters (22 cm×9 cm), the volume of the electroless copper solution compartment is 39.6 cubic centimetrs, giving a ratio for the fluid volume to the active area of each membrane of 39.6 to 198 or exactly 1 to 5. This ratio for the cathode compartment 72 and the anode compartment 76 is the same, that is, 1 to 5. In the prior art apparatus mentioned hereinbefore this ratio is much higher, being of the order of 1 to 1.

The ratio of the fluid volume to the active area of each membrane surface is not limited to the low ratio of 1 to 5 and may be as low as 1 to 10 and may also be higher, although preferably lower, than 1 to 1. It is noted that at a very low ratio of 1 to 10 the resistance of the fluid flow becomes too high and the membrane separation efficiency decreases. That is to say, the rate of flushing out or mixing the hydroxide becomes undesirably low.

It is noted that the assembly of the several components making up the electrodialytic cell unit 70 may be facilitated by vertically stacking the components one on top of another with the backup steel plate 78 at the bottom followed by the block 80, cover plate 84, cathode compartment frame 86, etc. Multiple cell electrodialytic cell units may be assembled in the same manner, continuing with the desired additional cell components before finally adding on the end block 116 and the end backup plate 118. For facilitating such stacking of the cell unit components, provision may be made for the use of vertical guide rods (not shown) that may be held in position by the backup plate 78 and which extend through aligned holes (not shown) provided adjacent opposite borders of the cell frame and block components.

In FIG. 13 there is shown a pictorial representation of a bank of six electrodialytic cell units 70' supported between end backup plates 78' and 118' and blocks 80' and 116' and forced together in fluid tight relation by six steel rods 170 and associated nuts (not shown). Each of the six cell units 70' includes a cathode compartment 72', an electroless copper solution compartment 74' and an anode compartment 76', as indicated. Inlet and outlet connectors for the anolyte solution are indicated in FIG. 13 at 148' and 154', respectively. An inlet connector for the electroless copper solution is indicated by the reference numeral 158', the outlet connector therefor being indicated by the numeral 162'.

In tests conducted with the single electrodialytic cell unit 70, it has been found that with 9 volts applied between the cathode electrode 86 and anode electrode 114 current densities of as high as 150 milliamperes per square centimeter may be tolerated over extended periods with no noticeable heating of the cell unit 70 or the electroless copper plating bath solution being chemically replenished, and with no adverse effect on the membranes 92 and 104. This current density is several times higher than that permissible with the prior art electrodialysis apparatus.

Thus, there has been provided, according to the present invention an improved structural assembly for an electrodialytic cell that enables higher electrical current densities, and as a conseqence, greater regenerative capacity for electroless copper plating bath solutions than has been possible of attainment with the prior art apparatus.

The electrodialytic cell unit of the present invention, moreover, is characterized by its adaptability for use as a standard structural component for repeated use in constructing multiple cell electrodialysis apparatus. It is further characterized in an absence of any tendency for leakage of fluids from or between the several compartments. Examination of the permselective membranes 92 and 164 after testing of the apparatus has revealed no damage thereto, nor any evidence of the membranes having suffered any adverse effect.

What is claimed is:
1. Electrodialysis apparatus for the replenishment of an electroless copper plating bath that tends to become depleted as the result of a water soluble cupric salt in an alkaline solution under copper plating and reducing conditions, said solution when becoming depleted tending to contain alkali metal salts as reaction products, comprising:
   a stacked assembly of components including, in sequence, a first backup plate,
   a first plastic press block,
   a cathode electrode,
   a cathode compartment cover frame,
   a cathode compartment frame which together with said cathode compartment cover frame defines a cathode compartment,
   a first perforated spacer coplanar with said cathode compartment frame,
   a first overlapping gasket frame,
   a first permselective membrane,
   a second overlapping gasket frame,
   an electroless copper solution compartment cover frame,
   an electroless copper solution compartment frame which together with said electroless copper solution compartment cover frame defines an electroless copper solution compartment,
   a second perforated spacer coplanar with said electroless solution compartment frame,
   a third overlapping gasket frame,
   a second permselective membrane,
   a fourth overlapping gasket frame,
   an anode compartment frame,
   a third perforated spacer coplanar with said anode compartment frame,
   an anode compartment cover frame which together with said anode compartment frame defines an anode compartment,
   an anode electrode,
   a second plastic press block, and
   a second backup plate,
   each of said frames having a centrally located opening therein with the centrally located openings in said overlapping gasket frames being slightly smaller than the openings in the other frames,
   said first perforated spacer being positioned in the opening in said cathode compartment frame,
   said second perforated spacer being positioned in the opening in said electroless copper compartment frame,
   said third perforated spacer being positioned in the opening in said anode compartment frame,
   means to force the stacked assembly of components together in fluid tight relation, and
   plurality of ports provided in the stacked components between said first and second press blocks, with a plurality of grooves provided by each of said cathode, electroless copper solution and anode compartment frames together with the respectively associated cathode, electroless copper solution and anode compartment cover frame forming inlet and outlet pathways from predetermined ones of said ports to said compartments,
   internal flow of catholyte, electroless copper solution and anolyte to and from the cathode, electroless copper solution, and anode compartments, respectively, being enabled by said ports and grooves.

2. Electrodialysis apparatus as defined in claim 1 wherein said first plastic press block includes an external input connector from a source of catholyte, an external input connector from a source of anolyte, and an external output connector back to the source of anolyte, and wherein said second press block includes an external output connector back to the source of catholyte, an external input connector from a source of electroless copper solution, and an external output connector back to the source of electroless copper solution.

3. Apparatus as defined by claim 1 wherein each of said first, second, and third perforated spacers consists of a first plurality of parallel slender rods positioned in a first plane crisscrossing a second plurality of slender rods positioned in an adjacent second plane, with the rods in the second plane touching and joined to the rods in the first plane.

4. Apparatus as defined in claim 3 wherein said cathode electrode is made of metal insoluble in the catholyte solution and said anode electrode is made of titanium with a dimensionally stable coating on the side thereof facing toward said anode compartment frame.

5. Apparatus as defined by claim 3 wherein said stacked assembly of components between said first and second plastic press blocks including said plurality of ports and plurality of grooves is repeated a plurality of times, in the sequence stated, beginning with said cathode compartment cover frame and ending with said anode electrode.

6. Apparatus as defined by claim 3 wherein said stacked assembly of components between said first and second plastic press blocks including said plurality of ports is repeated a plurality of times, alternating in the sequence, first in a reverse sequence beginning with said anode compartment cover frame and ending with said cathode electrode and then in the sequence first defined beginning with said cathode compartment cover frame and ending with said anode eleotrode.

7. An electrodialytic cell comprising, a catholyte compartment having a frame defining said catholyte compartment and having a centrally located cutout opening with a border therein, a cathode defining a wall of said catholyte compartment, an anolyte compartment having a frame defining said anolyte compartment and having a centrally located cutout opening with a border therein, an anode defining a wall of said anolyte compartment, an intermediate compartment having a frame defining said intermediate compartment and having a centrally located cutout opening with a border therein, a first anion permselective membrane having a first surface and a second surface, a second anion permselective membrane having a first surface and a second surface, first, second and third spacer means, each of said spacer means having edges, first, second, third and fourth overlapping gasket means, and fluid path providing means for providing separate fluid paths into and out of said catholyte, anode and intermediate compartments for the flow of a catholyte into, through and out of said catholyte compartment, an anolyte into, through and out of said anolyte compartment, and a fluid to be dialyzed into, through and out of the intermediate compartment, said first permselective membrane separating said intermediate compartment from said catholyte compartment, said second permselective membrane separating said intermediate compartment from said anolyte compartment, said first spacer means being positioned in the opening in said catholyte compartment frame between said cathode and said first surface of said first permselective membrane, said second spacer means being positioned in the opening in said intermediate compartment frame between said first and second permselective membranes, said third spacer means being positioned in the opening in said anolyte compartment frame between said anode said second surface of said second permselective membrane, said first overlapping gakset means having a centrally located cutout opening therein that is smaller than said first spacer means and positioned between said first spacer means and said first surface of said first permselective membrane and providing an overlapping portion protecting said first surface of said first permselective membrane from the edges of said first spacer means, said second overlapping gasket means having a centrally located cutout opening therein that is smaller than said second spacer means positioned between said second spacer means and said second surface of said first permselective membrane and providing an overlapping portion protecting said second surface of said first permselective membrane from the edges of said second spacer means, said third overlapping gasket means having a centrally located cutout opening therein that is smaller than said second spacer means and positioned between said second spacer means and said first surface of second permselective membrane and providing an overlapping portion protecting said first surface of said second permselective membrane from the edges of said second spacer means, and said fourth overlapping gasket means having a centrally located cutout opening therein that is smaller than said third spacer means and positioned between said third spacer means and said second surface of said second permselective membrane and having an overlapping portion protecting said second surface of said second permselective membrane from the edges of said third spacer means, said first spacer means being positioned in the opening in said catholyte compartment frame, said second spacer means being positioned in the opening in said intermediate compartment frame, and said third spacer means being positioned in the opening in said anolyte compartment frame, whereby said first, second, third and fourth gasket means also protect the associated surfaces of said first and second permselective membranes from the borders of the associated opening in said catholyte, intermediate and anolyte compartments.

8. An electrodialytic cell as defined by claim 7 wherein each of said spacer means comprise interconnected pairs of plastic rods with the rods in each pair being substantially parallel and disposed at a substantial angle with respect to the rods of the other pair.

9. An electrodialytic cell as defined by claim 8 further including a first pump means to establish a flow of catholyte fluid through said catholyte compartment,
- a second pump means to establish a flow of fluid to be chemically treated through said intermediate compartment, and
- a third pump means to establish a flow of anolyte through said anolyte compartment,
- each of said first, second and third spacer means causing the fluid flow past the surfaces of the associated membranes to be laminar thereby to minimize a tendency for the electrodialytic cell to generate excessive heat and limit the chemical treating capacity thereof.

10. An electrodialytic cell as defined in claim 8 further including a first pump means to establish a flow of catholyte fluid through said catholyte compartment,
- a second pump means to establish a flow of fluid to be chemically treated through said intermediate compartment, and
- a third pump means to establish a flow of anolyte through said anolyte compartment,
- wherein each of said first, second and third spacer means causes the fluid flow past the surfaces of the associated membranes to be in the form of a thin sheet with eddies and thereby turbulence introduced therein whereby to minimize a tendency for the electrodialytic cell to generate excessive heat which tends to limit the chemical treating capacity thereof, and to cause anions as they emerge on a surface of the membranes, after traversing the latter, to be rapidly carried away thereby promoting higher efficiency of ion transfer and allowing higher flow rates in each of the catholyte, intermediate, and anolyte compartments.

11. An electrodialytic cell as defined in claim 10 wherein said first, said second and said third pump means are substantially identical and cause the flow rates in each of said catholyte, intermediate and anolyte compartments to be substantially identical whereby to minimize any tendency for pressure differentials to be produced on the opposite sides of said first and said second permselective membranes.

12. An electrodialytic cell as defined by claim 11 wherein the fluid to be chemically treated in said intermediate compartment is a solution from a working electroless copper plating bath with the fluid in said catholyte compartment being an aqueous solution of alkali metal hydroxide and the fluid in said anolyte compartment being an aqueous solution of aqueous acid.

13. An electrodialytic cell as defined by claim 12 further including
- means to establish an electrical potential difference between said cathode and said anode, and
- wherein each of said first, said second, and said third pump means is characterized in having no metallic parts in contact with the fluid being pumped thereby to avoid undesired plating out of copper that might otherwise occur due to stray electrical currents.

* * * * *